United States Patent
Tran et al.

(10) Patent No.: US 8,943,514 B2
(45) Date of Patent: Jan. 27, 2015

(54) MIDDLE PARTNERS

(75) Inventors: Dang Van Tran, Laguna Niguel, CA (US); Yingnan Zhu, Irvine, CA (US); Xing Zheng, Irvine, CA (US); Jaffar Khoshgozaran, Pasadena, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/244,062

(22) Filed: Sep. 23, 2011

(65) Prior Publication Data

US 2012/0278821 A1 Nov. 1, 2012

Related U.S. Application Data

(60) Provisional application No. 61/481,153, filed on Apr. 30, 2011.

(51) Int. Cl.
| | |
|---|---|
| G06F 3/00 | (2006.01) |
| G06F 3/14 | (2006.01) |
| G06F 3/048 | (2013.01) |
| H04N 21/81 | (2011.01) |
| H04N 21/466 | (2011.01) |
| H04N 21/45 | (2011.01) |
| G06F 9/54 | (2006.01) |
| G06Q 10/00 | (2012.01) |
| G06F 17/21 | (2006.01) |
| H04N 21/462 | (2011.01) |

(52) U.S. Cl.
CPC ....... *H04N 21/8133* (2013.01); *H04N 21/8166* (2013.01); *H04N 21/4668* (2013.01); *H04N 21/4508* (2013.01); *G06F 9/54* (2013.01); *G06Q 10/00* (2013.01); *G06F 17/212* (2013.01); *H04N 21/4622* (2013.01)
USPC ............. 719/310; 715/864; 715/828

(58) Field of Classification Search
CPC ... G06F 9/54; G06F 2203/04803; G06F 17/212
USPC ............. 719/310; 717/100; 711/200
See application file for complete search history.

(56) References Cited

U.S. PATENT DOCUMENTS

| | | | | |
|---|---|---|---|---|
| 5,933,816 | A * | 8/1999 | Zeanah et al. | 705/35 |
| 6,064,980 | A | 5/2000 | Jacobi et al. | |
| 6,266,649 | B1 | 7/2001 | Linden et al. | |

(Continued)

FOREIGN PATENT DOCUMENTS

| | | |
|---|---|---|
| EP | 0848554 | 6/1998 |
| WO | 2007114956 | 10/2007 |

OTHER PUBLICATIONS

Jayasundara, Knowledge Management in Banking Industries: uses and opportunities, 2008.*

(Continued)

*Primary Examiner* — Lechi Truong
(74) *Attorney, Agent, or Firm* — Kenneth L. Sherman, Esq.; Michael Zarrabian, Esq.; Sherman & Zarrabian LLP

(57) ABSTRACT

A method includes retrieving content playing or to be played by a full-app and/or a micro-app. Additional context information is determined for the content. The content is augmented with the additional context information. The augmented context information is sent to a first micro-app for use in retrieving additional content to play or display along with the content.

25 Claims, 4 Drawing Sheets

(56) References Cited

U.S. PATENT DOCUMENTS

| | | | |
|---|---|---|---|
| 6,859,937 | B1 | 2/2005 | Narayan et al. |
| 6,983,255 | B2 | 1/2006 | Linehan |
| 7,668,821 | B1 * | 2/2010 | Donsbach et al. ............ 707/765 |
| 7,949,573 | B1 * | 5/2011 | Cohen et al. ................. 705/26.7 |
| 8,321,888 | B2 | 11/2012 | Epstein et al. |
| 8,341,521 | B2 * | 12/2012 | Ennals ......................... 715/277 |
| 8,510,779 | B2 | 8/2013 | Slothouber et al. |
| 2001/0034742 | A1 | 10/2001 | Stinson |
| 2002/0080272 | A1 | 6/2002 | Nakamura et al. |
| 2002/0120925 | A1 | 8/2002 | Logan |
| 2002/0147984 | A1 | 10/2002 | Tomsen et al. |
| 2003/0037144 | A1 | 2/2003 | Pestoni et al. |
| 2003/0200157 | A1 * | 10/2003 | Krajec ............................ 705/28 |
| 2004/0039657 | A1 * | 2/2004 | Behrens et al. ................. 705/26 |
| 2005/0038804 | A1 * | 2/2005 | Shimizu ....................... 707/100 |
| 2005/0149395 | A1 * | 7/2005 | Henkin et al. .................. 705/14 |
| 2006/0069753 | A1 * | 3/2006 | Hu et al. ....................... 709/220 |
| 2006/0156252 | A1 | 7/2006 | Sheshagiri et al. |
| 2006/0184579 | A1 | 8/2006 | Mills et al. |
| 2006/0277455 | A1 * | 12/2006 | Yamada et al. ............ 715/501.1 |
| 2006/0282856 | A1 | 12/2006 | Errico et al. |
| 2007/0250808 | A1 * | 10/2007 | Zeanah et al. ................ 717/100 |
| 2008/0159715 | A1 | 7/2008 | Fuasaro et al. |
| 2008/0183698 | A1 | 7/2008 | Messer et al. |
| 2008/0208834 | A1 | 8/2008 | Boyer et al. |
| 2008/0228806 | A1 * | 9/2008 | Davies et al. ................. 707/102 |
| 2009/0063990 | A1 | 3/2009 | Morris et al. |
| 2009/0307105 | A1 | 12/2009 | Lemay et al. |
| 2009/0327894 | A1 | 12/2009 | Rakib |
| 2010/0009702 | A1 | 1/2010 | James |
| 2010/0023966 | A1 | 1/2010 | Shahraray et al. |
| 2010/0030624 | A1 * | 2/2010 | Vanska et al. .................... 705/10 |
| 2010/0082489 | A1 | 4/2010 | Lin et al. |
| 2010/0142915 | A1 | 6/2010 | Mcdermott et al. |
| 2010/0226526 | A1 | 9/2010 | Modro et al. |
| 2010/0251280 | A1 | 9/2010 | Sofos et al. |
| 2010/0278337 | A1 | 11/2010 | Pliska et al. |
| 2010/0312644 | A1 | 12/2010 | Borgs et al. |
| 2010/0332304 | A1 | 12/2010 | Higgins et al. |
| 2011/0004533 | A1 | 1/2011 | Soto et al. |
| 2011/0071901 | A1 | 3/2011 | Fries |
| 2011/0153447 | A1 * | 6/2011 | Thomas et al. .............. 705/26.3 |
| 2011/0225417 | A1 | 9/2011 | Maharajh et al. |
| 2011/0289317 | A1 | 11/2011 | Darapu et al. |
| 2012/0054178 | A1 | 3/2012 | Tran et al. |
| 2012/0054179 | A1 | 3/2012 | Zhu et al. |
| 2012/0084183 | A1 | 4/2012 | Shanker et al. |
| 2012/0276996 | A1 | 11/2012 | Tran et al. |
| 2012/0278209 | A1 | 11/2012 | Tran et al. |

OTHER PUBLICATIONS

European Search Report dated Oct. 11, 2012 for European Application No. 12165886.8 from European Patent Office, pp. 1-7, Munich, Germany.

European Search Report dated Apr. 8, 2013 for European Application No. 11178725.5 from European Patent Office, pp. 1-6, Rijswijk, Netherlands.

U.S. Advisory Action dated Jun. 5, 2013 for U.S. Appl. No. 13/244,050.

U.S. Restriction Requirement dated Jun. 28, 2013 for U.S. Appl. No. 13/080,100.

U.S. Non-Final Office Action dated Jul. 22, 2013 for U.S. Appl. No. 13/095,672.

U.S. Non-Final Office Action for U.S. Appl. No. 13/080,100 mailed Aug. 14, 2013.

European Search Report dated Jan. 8, 2014 for European Patent Application No. 12164252.4 from European Patent Office, pp. 1-10, Rijswijk, Netherlands.

U.S. Final Office Action for U.S. Appl. No. 13/080,100 mailed Jan. 28, 2014.

U.S. Final Office Action for U.S. Appl. No. 13/095,672 mailed Jan. 6, 2014.

U.S. Final Office Action dated Apr. 1, 2013 for U.S. Appl. No. 13/244,050.

U.S. Notice of Allowance dated Mar. 21, 2013 for U.S. Appl. No. 13/244,069.

U.S. Non-Final Office Action dated Nov. 9, 2012 for U.S. Appl. No. 13/244,050.

U.S. Advisory Action for U.S. Appl. No. 13/095,672 mailed Mar. 11, 2014.

U.S. Non-Final Action for U.S. Appl. No. 13/244,050 mailed Mar. 24, 2014.

European Search Report dated Aug. 8, 2013 for European Patent Application No. 12165783.7 from European Patent Office, pp. 1-9, Rijswijk, Netherlands.

U.S. Non-Final Office Action for U.S. Appl. No. 13/080,100 mailed Nov. 4, 2014.

U.S. Non-Final Office Action for U.S. Appl. No. 13/095,672 mailed Oct. 20, 2014.

U.S. Non-Final Action for U.S. Appl. No. 13/244,050 mailed Nov. 6, 2014.

* cited by examiner

MIDDLE PARTNERS

CROSS REFERENCE TO RELATED APPLICATIONS

This application claims the benefit of priority under 35 U.S.C. 119(e) to U.S. Provisional Patent Application No. 61/481,153, filed Apr. 30, 2011, which is incorporated herein by reference for all purposes.

BACKGROUND OF THE INVENTION

1. Field of the Invention

The present invention relates to consumer electronics. More specifically the present invention relates to dynamic revenue sharing in systems containing micro-apps.

2. Description of the Related Art

The current media playing experience is, for the most part, a non-interactive and passive experience. For example, when viewing a television program on a television, the user simply watches the television. When a user listens to a music file on a portable media player, he or she simply listens to the music. While there are mechanisms available that allow users to use the same devices to interact with other data sources, such as a mechanism provided in newer televisions allowing users to surf the Internet while watching a program, the interaction is not geared specifically for the media being played. To the extent that a user wishes to "interact" with elements related to the media being played (such as, for example, purchasing a DVD copy of a television program being viewed), the user must do so manually.

Technologies exist that allow devices that have both media player and Internet-searching abilities to automatically switch between the two based upon the function currently being performed. For example, an options panel having a set of buttons can be used both in a television-playing mode and an Internet-surfing mode, providing a unified viewing experience. However, such technologies are limited to the system simply being aware of the current function being performed by the device, and the system does not take into account other factors, such as the media being played itself.

Furthermore, media playing is currently a single-device experience. While there may be any number of users watching or hearing media from a single device (such as a family sitting down and watching television together), the experience is limited to that single-device. It is becoming more and more prevalent, however, for there to be multiple accessible (and potentially Internet-enabled) devices usable within the same general area. For example, many individuals now carry cellular phones or other mobile communications devices with them at all times, many of which are Internet-enabled. Indeed, some mobile phones are "smart" enough to be considered mini-computers rather than what traditionally would be considered a phone. Additionally, tablet computers are becoming more prevalent, as are digital picture frames, which are also becoming Internet (or at least home network) enabled.

Furthermore, so-called "app stores" have created tremendous new revenue possibilities for both app store owners and developers. There remain opportunities, however, for new types of partners to be integrated into the app store business model and provide for new revenue streams.

SUMMARY OF THE INVENTION

In a first embodiment of the present invention, a method is provided comprising: retrieving, by a middle partner, content playing or to be played by a full-app and/or micro-app; determining additional context information for the content; augmenting the content with the additional context information; and sending the augmented context information to a first micro-app for use in retrieving additional content to play or display along with the content.

In a second embodiment of the present invention, a system is provided comprising: a full-app downloaded from an app store, wherein the full-app is configured to display full-app content on the display; a first micro-app downloaded from the app store, wherein the micro-app is configured to run simultaneously with the full-app content being displayed on the display; a middle partner configured to: intercept the full-app content; determine additional context information for the full-app content; augment the full-app content with the additional context information; and send the augmented context information to the first micro-app for use in retrieving additional content to play or display simultaneously with the content.

In a third embodiment of the present invention, an apparatus is provided comprising: means for retrieving, by a middle partner, full-app content; means for obtaining context information for the content; means for determining additional context information for the content; means for augmenting the content with the additional context information; and means for sending the additional context information to a first micro-app for use in retrieving augmented content to play or display along with the content.

In a fourth embodiment of the present invention, a non-transitory program storage device readable by a machine tangibly embodying a program of instructions executable by the machine to perform a method comprising: retrieving, by a middle partner, content playing or to be played by a full-app; determining additional context information for the content; augmenting the content with the additional context information; and sending the augmented context information to a first micro-app for use in retrieving additional content to play or display along with the content.

DETAILED DESCRIPTION OF THE INVENTION

Figure 1:
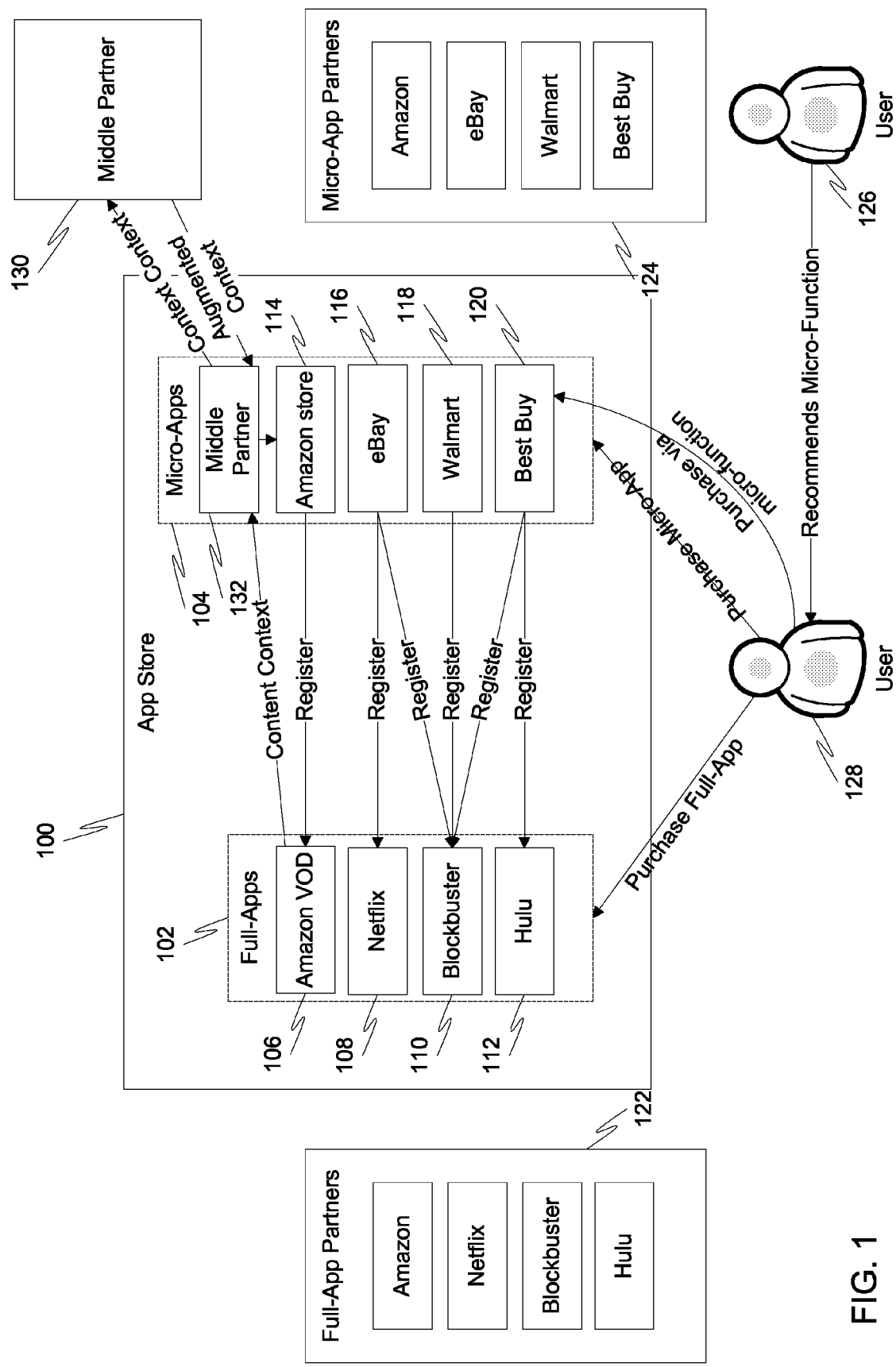
FIG. 1 is a diagram illustrating a micro-app system including a middle partner in accordance with an embodiment of the present invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

An embodiment of the present invention relies upon the concept of a "micro-app" (short for micro-application), which resides on one or more user devices. These micro-apps are designed to utilize context information in order to query one or more micro-app partners for result information. The context information can involve the media itself, the user, the device, the general environment, or social network. Once this result information is received from the micro-app partner(s), it can be presented on the user devices. In this manner, the micro-apps provide the ability to automatically retrieve results relevant to the currently-playing media and display them to viewers as the media is being played.

In an embodiment of the present invention, a middle partner is added into the framework, in addition to the micro-app partner and the full-app partner. This middle partner can augment the context information with additional context information. This may be performed seamlessly, such that the user need not even be aware that the middle partner exists. Furthermore, the middle partner can then also share in the revenue stream, receiving a percentage of payments from the App Store, just like a full-app partner or micro-app partner might. This new micro-app framework creates "toll bridges" among the decoupled full app partners, micro-app partners, middle partners, and users, as well as among various microtransactions. Each of these toll-bridges provides a potentially new revenue stream.

FIG. 1 is a diagram illustrating a micro-app system including a middle partner in accordance with an embodiment of the present invention. As can be seen, an App Store 100 may offer full apps 102 as well as micro-apps 104 for download (either free or by purchase). In this example, an Amazon™ video on demand full app 106, a Netflix™ streaming video full app 108, a Blockbuster™ streaming view full app 110, and a Hulu™ streaming video full app 112 are provided.

Additionally, an Amazon™ store micro-app 114, an eBay™ micro-app 116, a Wal-Mart™ micro-app 118, and a Best Buy™ micro-app 120 are provided. Each of these microapps 104 may register with one or more full-apps 102. In this example, there are various potential revenue streams. First, when the user purchases and downloads a full-app, the app store may share revenue with the full-app partner. The fullapp will also have access to available and downloaded microapps that have registered with it. While registration is not strictly required in order to interface a micro-app with a full-app, it does allow the micro-app to announce itself as part of the revenue chain. The full-app can decide which microapps to present, which order, which presentation style and preview, for example, in which to present the micro-apps. The purchase of a micro-app can generate revenue to be shared from the App Store 100 with the full-app partner 122, as well as with the micro-app partner 124. Of course, the revenue sharing parameters can also vary based upon the order in which the micro-apps are presented, or their presentation style and preview. For example, micro-apps that are displayed more prominently (such as higher up in a list or with a special font or formatting) can provide a higher percentage of revenue to the full app partner than those displayed less prominently.

Another revenue stream comes from actions taken within a micro-function of a micro-app. This could include a purchase made using the micro-function, but can also include nonpurchase related activities. For example, the micro-app partner may wish to reward the full app partner for every search conducted via the micro-function. Furthermore, a user 126 himself can also receive revenue shared from a micro-function purchase, due to the fact that user shared the item that was eventually purchased by user 128.

In an embodiment of the present invention a middle partner 130 may be included in the framework. This middle partner 138 may have an associated micro-app 132, although that is not strictly necessary in all embodiments. In some embodiments, the middle partner can have multiple associated micro-apps. The middle partner 130 (e.g., through the associated micro-app 132, or micro-apps in the case of multiple micro-apps) may intercept the content being played or displayed by one of the full-apps (here, full-app 106) and augment the context of the content with additional context. This may be performed by contacting the middle partner 130, which could include contacting servers operated by the middle partner 130 containing additional context information to add. For example, if the middle partner 130 is a movie information database such as Internet Movie Database (IMDB), the associated micro-app 132 may send what context information it does have about content (such as, for example, the title of the movie embedded in metadata in the movie being streamed by full-app 106) to the middle partner 130. IMDB servers may then lookup the context information, and retrieve additional context information (e.g., cast list, location of shooting, quotes from the movie, etc.) and send this information back to the micro-app 132. The micro-app may then insert this additional context information into the metadata of the content, such that ultimately when another entity, such as micro-app 114 performs, actions based on the context information (such as retrieving additional content related to the context information, retrieving products related to the context information, or dynamically adjusting a revenue sharing percentage based on the context information), that other entity is able to use the augmented context information in addition to the original context information for the content.

It should be noted that the augmented context information added by the middle partner 130 or middle partner's microapp 132 may, in some embodiments, represent all the context information for the content. For example, embodiments are possible where the content as being played or displayed by the full-app actually has no context information to begin with. The middle partner 130 can actually deduce information about the content and then retrieve additional context information to be used as the context information for the content. For example, a video or audio recognition micro-app, such as Shazam, may be compare the video or audio in the content to a database of known video and audio to determine the identification of the video or audio, such as its title. This information can then be used to query a back-end database for more information about the content, such as the information described earlier (e.g., cast list, location, quotes). So even though this document refers to the term "augmented context", one of ordinary skill in the art will recognize that this term shall be read broadly enough to cover cases where the original context was absent entirely and the information added is used as the sole context information for the content.

In one embodiment of the information, the augmented context may be time-based. In this embodiment, the middle partner or middle partner micro-app adds context information based on the time of the content being displayed. For example, certain context information may be added to one particular scene of a movie, indicating the cast list of just that scene, location of the scene, or other information relating just to that scene of the movie. Because this context information varies based on the timing of the where in the content the user is currently viewing, it may be known as "time-based" context. The time-based context can be pregenerated and tied to the particular content (by being stored on a server). Alternatively, it can be generated dynamically using the content.

The time-based context information may also alter which micro-app(s) are utilized at any point in time. For example, one micro-app may be used simultaneously with the playing of one scene of a movie, while a different micro-app may then launch automatically when the scene changes to another scene.

In an embodiment of the present invention, the middle partner is utilized in a seamless manner with few if any of the other entities in the system even being aware of them. For example, a micro-app for a middle partner may be added to the framework, and may act to intercept content played by a full-app, automatically query an external database, augment the context information associated with the content, and then send the augmented context information to an appropriate micro-app in lieu of the original context information. In this manner, the user may have no idea that the middle partner exists. Further, the full-app may not be aware that the middle partner exists either, simply going about playing its content as it normally would. Additionally, the ultimate recipient (non-middle partner) micro-app may also not be aware that the middle partner exists, receiving the augmented context information from the middle partner micro-app when it believed it was simply receiving original context information directly from the full-app.

It should also be noted that while the term "middle partner" is utilized, it is not necessary that this entity actually lie in the "middle" of a full-app and a micro-app. Embodiments are possible, for example, where the "middle partner" acts to augment the context information relating to content even before the content reaches the full-app to be played. For example, if IMDB™ is the middle partner, movies stored by Netflix™ for online streaming can be augmented with the IMDB™ context information even before the user launches the Netflix™ full-app. It should also be noted that the middle partner could also be a micro-app in itself. For example, IMDB™ may be a micro-app for Netflix™.

The original (non-augmented) context information can be retrieved from a number of different sources. One source is the media being played itself. This type of context information may be called "media content context information" and may include any information about the media itself. One common source for such information can be metadata that accompanies the media. For television broadcasts, this information may be embedded in a digital broadcast stream. For over the top (OTT) video on demand (VOD) videos or photos, this information may be encoded in the downloaded media files, or may be transmitted separately. For DVD or Blu-Ray™ discs, this information may be encoded on the disk itself (such as in a dedicated metadata file), or may be available externally, such as using an external GD3 identification database. Normal video, photo, or music files stored on a hard disk drive can contain metadata information within the files themselves, such as the ID3 metadata in an mp3 file, or an xif file for a digital camera. Digital Living Network Alliance (DLNA) streams can include embedded metadata as well. Example of media content context information may include titles, genres, actors, directors, running times, scene information, music tracks, composers, authors, etc. Additional file streams, such as from social networking websites or from video streaming web sites can also be utilized with embodiments of the present invention. Additionally, files from non-media applications can also be utilized, such as news, maps, games, etc.

It should also be noted that the term "content provider" as used in this document shall be construed broadly to cover any entity that provides information or services that may be desired by the user. This may include textual information, graphical information, shopping capabilities, mapping tools, and so on. While some in the art make a distinction between "service provider" and "content provider," others in the art recognize that many providers blur the line between providing content and providing service and simply group all providers under the single title of "content provider." It is this latter definition that is used throughout this document.

It should also be noted that the term "media" as used in this document shall be interpreted broadly to include more than just traditional video, photos, and text, but also other information for user viewing or listening that is transmitted to a device. Thus, "media" can include, for example, text in a newsreader application, maps in a mapping application, or graphics in a game application, and thus the "media content context information" can include context information regarding these items as well. In some places in this document, the term "full-app content" is used in the place of media content to make explicitly clear that even non-media related content can be used as the basis for context information and for retrieving results related to the full-app content. Furthermore, this "full-app content" can come from many sources, including live television, media players, micro-app results, DVDs, HDMI ports, etc.

It should also be noted that the term "micro-app" as used in this document shall be interpreted broadly to include ay application that can be installed on a device that queries a content provider. However, in some embodiments the micro-app is connected to another application or service and provides limited micro-functions within the full application or service (called "full-app"). For example, an Amazon™ application might provide a full user interface to the Amazon.com™ marketplace, but an Amazon™ micro-app may provide only limited micro-functions (such as automatic search based on context, limited purchasing ability, etc.). A micro-function is a function that performs merely one action, such as "add-to-cart" or "add-to-favorites".

There are various other sources for context information than merely the media or full-app content itself. One such other source for context information is the user. Various information about the user can be retrieved either explicitly or implicitly. For example, a user profile may be stored that contains user information such as age, sex, interests, profession, etc. This type of context information may be useful in determining which information to retrieve from the content providers. For example, if a family is viewing a documentary program about Africa, it may be desirable to deliver to the children pictorial information about lions, giraffes, rhinoceroses, etc. (which can be delivered directly to the children's devices), while simultaneously delivering to the adults textual information about the history of the region being observed on adults' devices (or on a shared device). By including not only the media content context information but also the user context information, the system is able to deliver such personalization to individual devices.

The user profile is an example of explicitly-specified user context information, but this information may also be deduced from implicit sources. For example, the system may be able to deduce that a user is a child by examining the application usage history (or even just the applications loaded) on the user's device. If, for example, the device contains a lot of games typically played by young children, it can be deduced that the user of the device is a child.

Another source for context information is the device (for example, a television, mobile phone, computer, etc.). Various information about the device can be retrieved either explicitly or implicitly. For example, a device profile may be stored that contains device information such as manufacturer, memory, processor speed, display characteristics, input devices, etc. This type of context information may also be useful in determining which information to retrieve from the micro-app partners. For example, if a family is viewing a comedy program, the system may determine it would be beneficial to distribute relevant information about the lead actor to the various devices, including, for example, information about recent projects that the lead actor is appearing in. If one device has much greater processing speed, memory availability, and display characteristics than another, it may be desirable, for example, to provide a video movie trailer for a recent movie the actor has appeared in to the more powerful device, while the less powerful device receives only textual information about the actor's new movie.

A device profile is an example of explicitly-specified device context information, but this information may also be deduced from implicit sources. For example, the system may be able to deduce that the device has the capability to play high definition video if there are a number of high-definition video files stored in the memory of the device.

Another source for context information is the environment in which the device is operating. This may include a variety of different things, including external environmental information (time of day, temperature, location, etc.) and internal environmental information (operating system, other applications being run simultaneously, etc.). This type of context information may also be useful in determining which information to retrieve from the micro-app partners. For example, if the location of the device is "at home," then the additional data downloaded from micro-app partners may be more recreational than if the device is "at work."

External context information can be retrieved from a variety of external sensors or devices. For time of day, for example, a clock device located on a motherboard may be accessed. For location, a global positioning sensor (GPS) or similar tracking device may be utilized. For temperature, a temperature sensor may be utilized (alternatively, location information may be fed to an external database where current temperature can be retrieved for the location).

Another source for context information is social networking data. For example, user status information from social networking web sites or data streams can be examined to determine a current status for the user, which then may be used to aid in serving results. For example, if the user indicated a Facebook™ status as "on vacation," a different set of results may be served than if the user had indicated that he was "at work."

In another embodiment, different weights can be assigned to different contexts according to other contexts. For example, a different weight may be assigned to a device of one user versus if that same device were operated by another user.

In another embodiment of the present invention, a "middleware" framework is provided that segregates micro-app partners from the micro-apps (and even from the micro-app companies, in some embodiments). The framework allows it to not be necessary for the micro-app partners to even be aware of the micro-app companies, and vice-versa. Both entities can simply program against the middleware framework APIs. In this manner, any application or source (e.g., Blu-Ray™, Netflix™, DLNA media, WiseLink, non-media widgets) can collaborate with any other services (micro-apps) without any knowledge of the service convergence or mash-up outcomes. Additionally, the framework can automatically provide other context and a unified user interface for multiple devices. Using various artificial intelligence engines, the framework can automatically improve the quality of micro-service search results. Algorithms can include dynamic lookup tables based on multi-context info.

Various mechanisms to monetize the above processes and systems are also anticipated. In one embodiment, micro-app partners compensate both the system operator or manufacturer (e.g., the operator of the micro-app store) and the media companies that encode their media data with the appropriate metadata (in the appropriate format). This compensation may be, for example, based on purchases made using the micro-apps, such that when a user makes a purchase at the micro-app partner (e.g., buys a related toy from Amazon™), the micro-app store and the media company are compensated out of the proceeds. In another embodiment, the compensation may be based on the number of page views (or "clicks") received at the micro-app partner from micro-apps from the micro-app store and based on media produced by the media companies. Such "per click" compensation may be more beneficial for micro-app partners that do not sell products, but rather generate income based on advertising, such as a mapping micro-app partner. In another embodiment, lump sum payments are simply made periodically as part of a partnership agreement between micro-app partners and the operator of the micro-app store and media companies.

In another embodiment of the present invention, income generated by subscriptions to the media companies (e.g., Netflix™ subscriptions) can be shared with the micro-app store operator, to the extent that the micro-app store creates new subscription opportunities for the media companies.

In another embodiment of the present invention, an affiliate and referral system is designed to include other entities other than the media companies, micro-app store operator, and micro-app partners. This may include, for example, compensating owners of additional web sites (affiliates) that drive traffic to the micro-app store and from which money is generated for either the media companies or the micro-app partners. The system may be designed to track an affiliate ID as part of this process to ensure proper credit is given. This affiliate ID may be tracked, for example, as part of a cookie stored during a network session.

In another embodiment of the present invention, certain micro-apps may be considered "premium" micro-apps, requiring the user to subscribe or purchase the micro-app from the micro-app store operator. Portions of this income generated may be shared with the media companies and/or micro-app partners.

In another embodiment of the present invention, income generated from the rental or purchase of digital information (e.g., media) from either the media companies or micro-app partners can be shared among the media companies, micro-app store operator, and/or micro-app partners.

Figure 2:
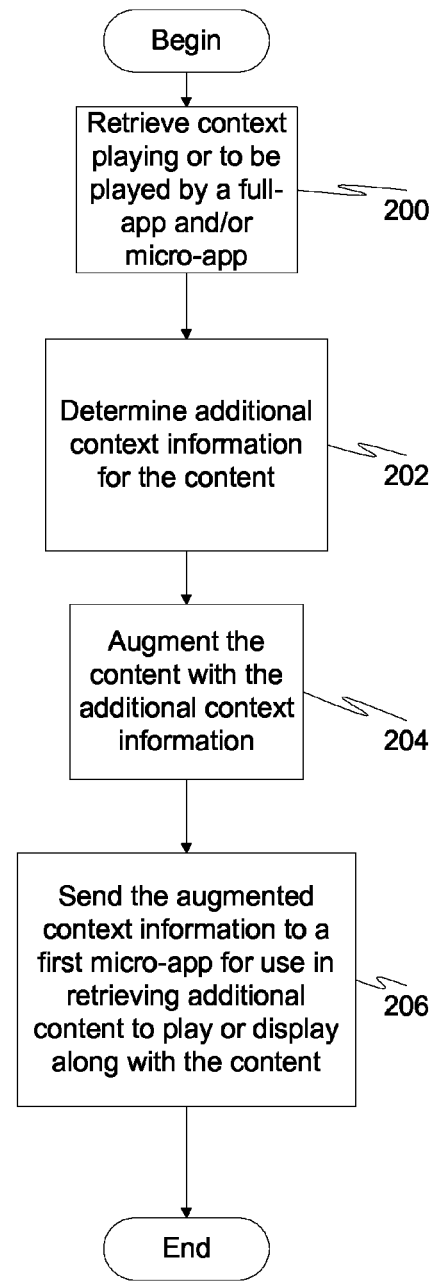
FIG. 2 is a flow diagram illustrating a method in accordance with an embodiment of the present invention.

FIG. 2 is a flow diagram illustrating a method in accordance with an embodiment of the present invention. Each step of the method may be performed by a middle partner. More specifically, a micro-app associated with the middle partner may perform each of the steps. At 200, content playing or to be played by a full-app and/or micro-app may be retrieved. This may include "intercepting" the content, although the term "intercepting" shall be construed broadly as it is possible that the content is retrieved prior to it even being sent to the full-app. This retrieval may be performed transparently, i.e., without indicating to the full-app that retrieval is occurring. At 202, additional context information for the content is determined. This may include using original context information about the content, such as its title or other information stored in metadata, and querying an external database for the additional context information. At 204, the content is augmented with the additional context information. This may include, for example, adding the additional context information into the metadata, similar to how the original context information was stored. At 206, the augmented context information is sent to a first micro-app for use in retrieving additional content to play or display along with the content. This sending may be performed transparently, i.e. in a manner such that the first micro-app is unaware that the context information is not coming directly from the full-app.

Figure 3:
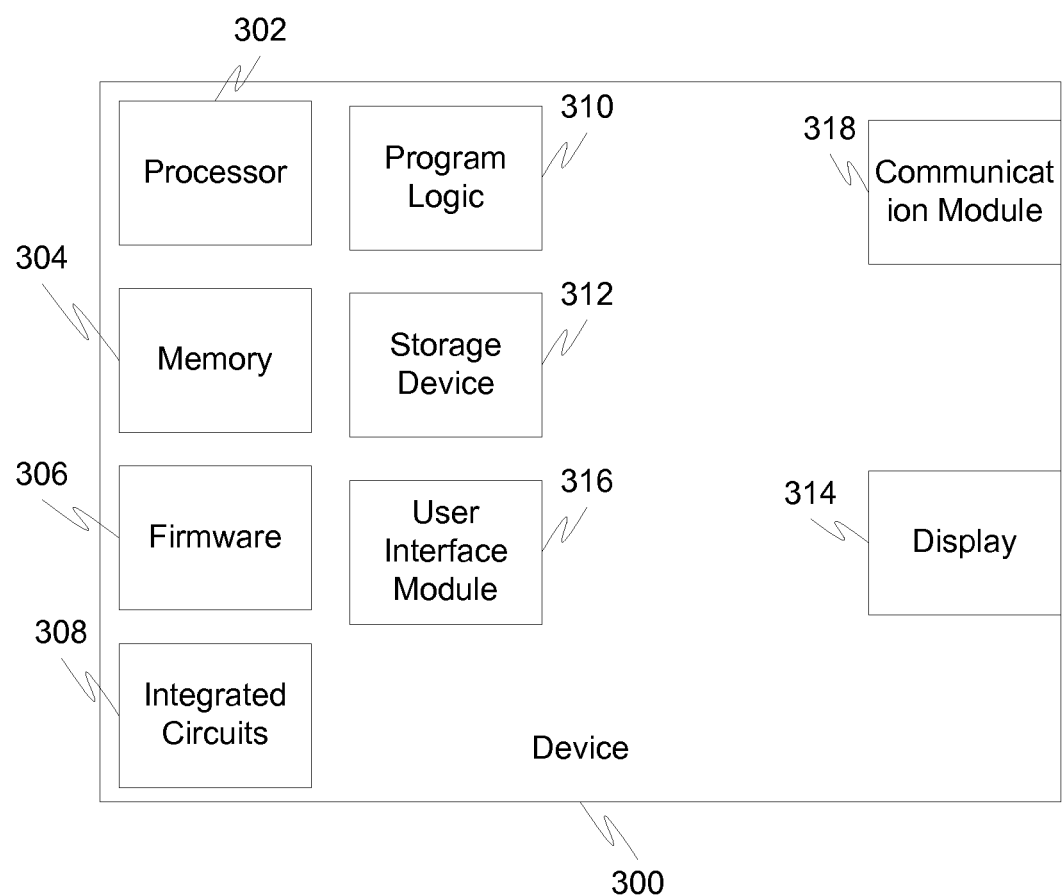
FIG. 3 depicts example hardware components in device capable of implementing embodiments of the method and system disclosed herein.

FIG. 3 depicts example hardware components in device capable of implementing embodiments of the method and system disclosed herein. In one embodiment, the device 300 comprises a television having a processor 302, memory 304, firmware 306, integrated circuits 308, program logic 310, a storage device 312, a display screen 314, a user interface module 316, and a communication module 318. The communication module 318 may be, for example, a network interface device or a wireless radio transmitter/receiver.

Figure 4:
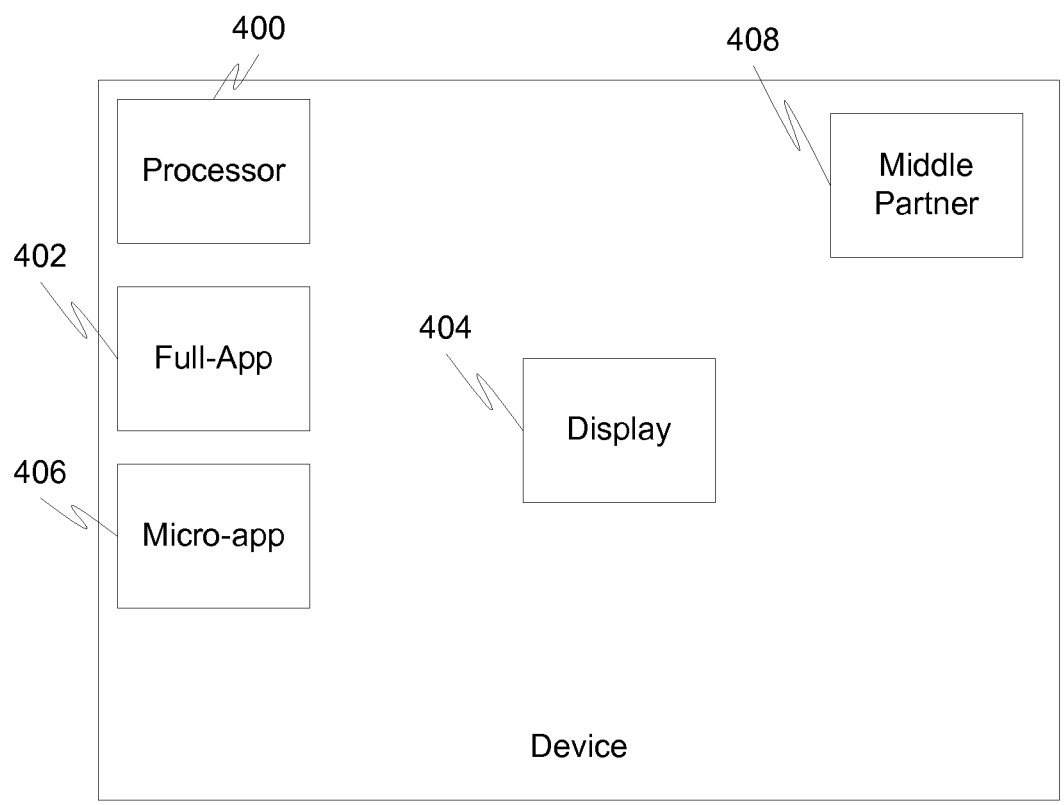
FIG. 4 is a block diagram illustrating a first device in accordance with an embodiment of the present invention.

FIG. 4 is a block diagram illustrating a first device in accordance with an embodiment of the present invention. A processor 400 may act to execute many, if not all, the functions of the present invention. A full-app 402 may be configured to display full-app content on a display 404. A first micro-app 406 may be configured to run simultaneously with the full-app content being displayed on the display 404. A middle partner 408 may then be configured to: intercept the full-app content, determine additional context information for the full-app content, augment the full-app content with the additional context information, and send the additional context information to the first micro-app for use in retrieving additional content to play or display simultaneously with the content.

In one embodiment of the present invention, the system is extended to a cloud. In this manner, for example, the raw context can be retrieved from any number of different devices in different locations. Consumers have been accumulating volumes of digital assets and using more and more Internet services. Consumers typically access these assets and services using more than one device. A typical consumer may have a desktop computer, a laptop computer, and a cell phone (and possibly other devices as well) that can all be used to access and gather information and media. The trend will continue while huge amounts of services and contents are made available on the Web daily. These assets and services are typically scattered around in personal devices as well as in various informal groupings of information known as clouds. A cloud is a formal or informal grouping of information based on control. The present invention anticipates extending the augmented context systems in a similar manner.

As will be appreciated to one of ordinary skill in the art, the aforementioned example architectures can be implemented in many ways, such as program instructions for execution by a processor, as software modules, microcode, as computer program product on computer readable media, as logic circuits, as application specific integrated circuits, as firmware, as consumer electronic device, etc. and may utilize wireless devices, wireless transmitters/receivers, and other portions of wireless networks. Furthermore, embodiment of the disclosed method and system for displaying multimedia content on multiple electronic display screens can take the form of an entirely hardware embodiment, an entirely software embodiment, or an embodiment containing both software and hardware elements.

The term "computer readable medium" is used generally to refer to media such as main memory, secondary memory, removable storage, hard disks, flash memory, disk drive memory, CD-ROM and other forms of persistent memory. It should be noted that program storage devices, as may be used to describe storage devices containing executable computer code for operating various methods of the present invention, shall not be construed to cover transitory subject matter, such as carrier waves or signals. Program storage devices and computer readable medium are terms used generally to refer to media such as main memory, secondary memory, removable storage disks, hard disk drives, and other tangible storage devices or components.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method comprising:
   downloading a full-app, wherein the full-app is configured to display full-app content and obtain original context based on the full-app content;
   downloading a first micro-app, wherein the micro-app is configured to run simultaneously with the full-app content;
   intercepting, by the middle partner, the full-app content;
   determining additional context information for the full-app content;
   augmenting the full-app content and the original context with the additional context information
   determining, by the middle partner, additional context information for the content;
   augmenting the content and the original context with the additional context information; and
   sending the augmented context information to a first micro-app in lieu of the original context for use in retrieving additional content to play or display along with the content;
   wherein the middle partner includes a second micro-app that queries an external database.

2. The method of claim 1, wherein the retrieving is performed without indicating to the full-app that retrieving is occurring.

3. The method of claim 1, wherein the sending the augmented context information is performed in a manner such that the first micro-app is unaware that the augmented context information is not coming directly from the full-app.

4. The method of claim 1, wherein the retrieving, determining, augmenting, and sending are performed by a second micro-app, wherein the second micro-app is associated with the middle partner.

5. The method of claim 1, wherein the determining includes querying an external database using original context information embedded in metadata in the content.

6. The method of claim 1, wherein the determining includes querying an external database using context information derived for the content.

7. The method of claim 1, wherein the additional context information is time-based context information.

8. The method of claim 7, wherein the time-based context information is utilized to determine a micro-app to launch at a particular running time of the content.

9. The method of claim 1, further comprising:
sharing revenue with the middle partner based on the augmented context.

10. The method of claim 9, wherein the original context information include environmental context information.

11. The method of claim 9, wherein the original context information includes user context information.

12. The method of claim 9, wherein the original context information includes device context information.

13. The method of claim 9, wherein the original context information is obtained from metadata for the content.

14. The method of claim 9, wherein the original context information is deduced by examining the content.

15. The method of claim 9, wherein the additional context is deduced by examining the content using one or more of video recognition and audio recognition.

16. The method of claim 1, wherein the additional context information is time-based context information that is obtained based on a particular portion of video content being viewed.

17. The method of claim 1, wherein the content comprises one or more of video, audio, text, graphics or photo media.

18. A system comprising:
a processor;
a full-app downloaded from an app store using the processor, wherein the full-app is configured to display full-app content on a display and obtain original context based on the full-app content;
a first micro-app downloaded from the app store using the processor, wherein the micro-app is configured to run simultaneously with the full-app content being displayed on the display;
a middle partner using another processor to:
intercept the full-app content;
determine additional context information for the full-app content;
augment the full-app content and the original context with the additional context information; and
send the augmented context information to the first micro-app in lieu of the original context for use in retrieving additional content to play or display simultaneously with the content,
wherein the middle partner includes a second micro-app that queries an external database.

19. The system of claim 18, wherein the additional content is product information.

20. The system of claim 18, wherein the additional content includes a map.

21. The system of claim 18, wherein the micro-app inserts the additional context into metadata of the content.

22. An apparatus comprising:
a processor;
downloading a full-app using the processor, wherein the full-app is configured to display full-app content and obtain original context based on the full-app content;
downloading a first micro-app using the processor, wherein the micro-app is configured to run simultaneously with the full-app content;
means for retrieving, by a middle partner using the processor, full-app content;
means for obtaining original context information for the content;
means for determining, by the middle partner, additional context information for the content;
means for augmenting the content and the original context with the additional context information; and
means for sending the augmented context information to a first micro-app in lieu of the original context for use in retrieving additional content to play or display along with the content,
wherein the middle partner includes a second micro-app that queries an external database.

23. The apparatus of claim 22, wherein a second micro-app inserts the additional context into metadata of the content for the first micro-app to retrieve the additional content related to the additional context.

24. The apparatus of claim 23, further comprising the first micro-app one or more of: retrieves additional content related to the additional context, retrieves one or more products related to the additional context or dynamically adjusts a revenue sharing percentage based on the additional context.

25. A non-transitory program storage device readable by a machine tangibly embodying a program of instructions executable by the machine to perform a method comprising:
downloading a full-app, wherein the full-app is configured to display full-app content and obtain original context based on the full-app content;
downloading a first micro-app, wherein the micro-app is configured to run simultaneously with the full-app content;
intercepting, by the middle partner, the full-app content;
determining, by the middle partner, additional context information for the content;
augmenting the content and the original context with the additional context information; and
sending the augmented context information to a first micro-app in lieu of the original context for use in retrieving additional content to play or display along with the content;
wherein the middle partner includes a second micro-app that queries an external database.

* * * * *